United States Patent
Nguyen

(10) Patent No.: US 6,738,066 B1
(45) Date of Patent: May 18, 2004

(54) SYSTEM, METHOD AND ARTICLE OF MANUFACTURE FOR DETECTING COLLISIONS BETWEEN VIDEO IMAGES GENERATED BY A CAMERA AND AN OBJECT DEPICTED ON A DISPLAY

(75) Inventor: Katerina H. Nguyen, Palo Alto, CA (US)

(73) Assignee: Electric Planet, Inc., Palo Alto, CA (US)

( * ) Notice: Subject to any disclaimer, the term of this patent is extended or adjusted under 35 U.S.C. 154(b) by 0 days.

(21) Appl. No.: 09/364,629

(22) Filed: Jul. 30, 1999

(51) Int. Cl.[7] ................................................. G06T 7/20
(52) U.S. Cl. ........................ 345/474; 345/629; 345/958
(58) Field of Search .............................. 345/421, 473, 345/422, 958, 419, 474, 629; 382/103, 154

(56) References Cited

U.S. PATENT DOCUMENTS

| | | |
|---|---|---|
| 4,843,568 A | 6/1989 | Krueger et al. |
| 5,148,477 A | 9/1992 | Neely et al. |
| 5,384,912 A | 1/1995 | Ogrinc et al. |
| 5,454,043 A | 9/1995 | Freeman |
| 5,469,536 A | 11/1995 | Blank |
| 5,534,917 A | 7/1996 | MacDougall |
| 5,548,659 A | 8/1996 | Okamoto |
| 5,563,988 A * | 10/1996 | Maes et al. ................ 345/421 |
| 5,570,113 A | 10/1996 | Zetts |
| 5,581,276 A | 12/1996 | Cipolla et al. |
| 5,623,587 A | 4/1997 | Bulman |
| 5,631,697 A | 5/1997 | Nishimura et al. |
| 5,767,867 A | 6/1998 | Hu |
| 5,781,198 A | 7/1998 | Korn |
| 5,790,124 A | 8/1998 | Fischer et al. |
| 6,005,967 A * | 12/1999 | Nakagawa et al. ........ 345/422 |
| 6,236,736 B1 * | 5/2001 | Crabtree et al. ............ 382/103 |

OTHER PUBLICATIONS

Crow, F. C., "Summed–Area Tables for Texture Mapping," Computer Graphics, vol. 18(3), 207–212, Jul., 1984.

Aggarwal, J. K., Cai, Q. "Human Motion Analysis: A Review," IEEE Nonrigid and Articulated Motion Workshop Proceedings, 90–102, (1997).

Huang, Chu–Lin, Wu, Ming–Shan, "A Model–based Complex Background Gesture Recognition System," IEEE International Conference on Systems, Man and Cybernetics, vol. 1 pp. 93–98, Oct. 1996.

Cortes, C., Vapnik, V., "Support–Vector Networks," Machine Learning, vol. 20, pp. 273–297, (1995).

Swain, M. J., Ballard, D. H., "Indexing Via Color Histograms," Third International Conference on Computer Vision, pp. 390–393, Dec., 1990.

Review: Game Boy Camera, Jul. 15th, 1998, http://www.gameweek.com/reviews/july15/gbc.html.

Barbie PhotoDesigner w/Digital Camera, Box, http://www.actioncd.com/ktkt0126.asp.

GMD Digital Media Lab: The Virtual Studio; http://viswiz.gmd.de/DML/vst/vst.html.

* cited by examiner

Primary Examiner—Mark Zimmerman
Assistant Examiner—Kimbinh T. Nguyen
(74) Attorney, Agent, or Firm—Van Pelt & Yi LLP

(57) ABSTRACT

A system, method and article of manufacture are provided for detecting collisions or any other type of interactions between video images and an object depicted on a display. First, video images generated by a camera are received. Upon receipt, a first collision detection operation is executed for generating a first confidence value representative of a confidence that the received video images have collided with an object depicted on a display. Also executed is a second collision detection operation for generating a second confidence value representative of a confidence that the received video images have collided with the object depicted on the display. The first confidence value and the second confidence value are then made available for various applications. Such applications may depict an interaction between the video images and the object depicted on the display based on the first confidence value and the second confidence value.

29 Claims, 13 Drawing Sheets

SYSTEM, METHOD AND ARTICLE OF MANUFACTURE FOR DETECTING COLLISIONS BETWEEN VIDEO IMAGES GENERATED BY A CAMERA AND AN OBJECT DEPICTED ON A DISPLAY

CROSS-REFERENCE TO RELATED APPLICATIONS

This application is related to a U.S. patent application filed Jul. 30, 1999 with the title "SYSTEM, METHOD AND ARTICLE OF MANUFACTURE FOR TRACKING A HEAD OF A CAMERA-GENERATED IMAGE OF A PERSON" and Katerina H. Nguyen and Jeffrey L. Edwards listed as inventors; a U.S. patent application filed Oct. 15, 1997 under Ser. No. 08/951,083 with the title "A SYSTEM AND METHOD FOR PROVIDING A JOINT FOR AN ANIMATABLE CHARACTER FOR DISPLAY VIA A COMPUTER SYSTEM"; a U.S. patent application filed Oct. 15, 1999 under Ser. No. 09/174,491 with the title "METHOD AND APPARATUS FOR PERFORMING A CLEAN BACKGROUND SUBTRACTION"; and a U.S. patent application filed Jul. 30, 1999 with the title "WEB BASED VIDEO ENHANCEMENT APPARATUS, METHOD, AND ARTICLE OF MANUFACTURE" and Subutai Ahmad and Jonathan Cohen listed as inventors and which are all incorporated herein by reference in their entirety.

BACKGROUND OF THE INVENTION

1. The Field of the Invention

The present invention relates to displaying video images generated by a camera on a display, and more particularly to detecting collisions or any other type of interactions between video images generated by a camera and an object depicted on a display.

2. The Relevant Art

It is common for personal computers to be equipped with a camera for receiving video images as input. Conventionally, such camera is directed toward a user of the personal computer so as to allow the user to view himself or herself on a display of the personal computer during use. To this end, the user is permitted to view real-time images that can be used for various purposes.

One purpose for use of a personal computer-mounted camera is to display an interaction between camera-generated video images and objects generated by the personal computer and depicted on the associated display. In order to afford this interaction, multiple operations must be carried out. For example, the user's position and body parts must be identified. This may be carried out using a "blues screen."

Once the user's position and body parts are identified, the task of identifying a current position of the user image still remains. This includes identifying a current position of any body parts of the user image. Identification of an exact current location of the user image and his or her body parts is critical for affording accurate and realistic interaction with objects in the virtual computer-generated environment.

Each time the current location of the user image is identified, it is done so with some associated probability of error. In many applications, the ultimately displayed interaction may be improved if such applications were given some indication of a level of certainty that the current location of the user image has been identified correctly.

Many difficulties arise during the process of identifying the current position of the body parts of the user image. It is often very difficult to discern the user image with respect to the background image. While there are many different types of methods for accomplishing this task which have associated benefits, each of such methods exhibit certain drawbacks that can result in errors. These errors are often manifested in the user image being partly transparent or in flawed interaction between the user image and the objects of the virtual environment.

Until now, processes that identify current positions associated with the user image employ only a single strategy. One process focuses on identifying the location of the user image by recognizing body parts. This may be accomplished in various ways. For example, relative shapes and sizes of the body parts of the user image may play a role in recognition. Further, a history of the body parts of the user image may be employed. This strategy, however, often exhibits problems when items in the background image exhibit shapes and sizes similar to the body parts of the user image. Further, the recognition process may be extremely complicated and subject to error when the images of the user are taken from different perspectives or in combination with foreign objects, e.g., hats, etc.

Other processes that identify current positions associated with the user image rely on motion of the various body parts of the user image and motion of the user himself or herself. These methods also exhibit shortcomings. For instance, if items in the background image move for any reason, such motion may be erroneously construed to be associated with the person and therefore result in faulty interaction with the virtual computer-generated environment. Examples of such items in the background image may include a television, door, or any other device that may move for any reason. An example of the foregoing motion detection process may be found in J. K. Aggarwal and Q. Cai. Human Motion Analysis: A Review. IEEE Nonrigid and Articulated Motion Workshop Proceedings, 90–102 (1997).

As such, when used individually, the foregoing processes that identify current positions associated with the user image often result in erroneous results.

SUMMARY OF THE INVENTION

A system, method and article of manufacture are provided for detecting collisions or any other type of interactions between video images generated by a camera and an animated object or objects depicted on a display. First, video images generated by a camera are received. Upon receipt, a first collision detection operation is executed for generating a first confidence value representative of a confidence that the received video images have collided with an object depicted on a display. Further executed is a second collision detection operation for generating a second confidence value also representative of a confidence that the received video images have collided with the object depicted on the display.

The first confidence value and the second confidence value may then be made available for use by various applications. As an option, only one of the collision detection operations may be run at a time in place of both being run together. As such, related applications may depict an interaction between the video images and the object depicted on the display based on the first confidence value and/or the second confidence value. As an option, the interaction depicted on the display may include the object reacting to a collision with the video images.

By extracting a confidence value from two types of collision detection operations, an application may utilize such confidence values to determine whether a collision has actually occurred. Further, the application may assume a collision has occurred based on a higher or lower confidence in order to afford a desired level of interaction.

In one embodiment, the first collision detection operation may include a background subtraction operation while the second collision detection operation may include an operation other than a background subtraction operation, e.g., motion-based process.

The first collision detection operation may first include subtracting a background image of the video images in order to extract a person image. Next, body parts of the person image are recognized. A speed and/or a direction of the object depicted on the display is then generated based on a collision between at least one body part of the person image of the video images and the object depicted on the display. This speed and/or direction of the object may also be used by the application for depicting the interaction between the video images and the object depicted on the display.

As an option, the speed may be generated based on an overlap between the body part of the person image of the video images and the object depicted on the display. Further, the direction may be generated based on a relative position between the body part of the person image of the video images and a center of the object depicted on the display.

As mentioned earlier, the first collision detection operation includes recognizing the body parts of the person image. This act may include first identifying a location and a number of person images in the video images. Further, a head, a torso, and limbs of the person image in the video images may be tracked. A head bounding box confidence may also be determined that is associated with a certainty that the head of the person image is correctly identified. It should be noted that the first confidence value may be based at least in part on the head bounding box confidence.

As an option, the location and the number of person images in the video images may be identified using a history of the location and the number of person images in the video images. Also, the location and the number of person images in the video images may be identified using a mass distribution.

The head may be tracked by using a history of the head or a mass distribution similar to that used in the identification of the location and the number of person images in the video images. Further, the torso of the person image in the video images may be. tracked using information relating to the tracking of the head of the person image.

The second collision detection operation may include generating a motion distribution of a person image in the video images by utilizing frame differencing. After the generation of the motion distribution, the motion distribution may be filtered after which a location of a head of the person image in the video images may be estimated using head tracking. A location of a torso of the person image may then be estimated based on the estimated location of the head of the person image in the video images.

The second collision detection operation may also include determining valid ranges of motion based on the estimated location of the head and the estimated location of the torso of the person image in the video images. If any detected motion resides outside of the valid ranges of motion, such motion is eliminated. Similar to the first collision detection operation, a speed and/or a direction of the object depicted on the display may be generated based on a collision between at least one body part of the person image of the video images and the object depicted on the display. Similar to the first collision detection operation, the second collision detection operation also generates a confidence of a head bounding box of the head of the person image, wherein the second confidence value is based at least in part on the head bounding box confidence.

These and other aspects and advantages of the present invention will become more apparent when the Description below is read in conjunction with the accompanying Drawings.

BRIEF DESCRIPTION OF THE DRAWINGS

The present invention will be readily understood by the following detailed description in conjunction with the accompanying drawings, with like reference numerals designating like elements.

FIG. 12A illustrates a motion distribution employed by the process of FIG. 12 for detecting collisions between video images generated by a camera and an object depicted on a display.

DETAILED DESCRIPTION OF THE PREFERRED EMBODIMENTS

Figure 1:
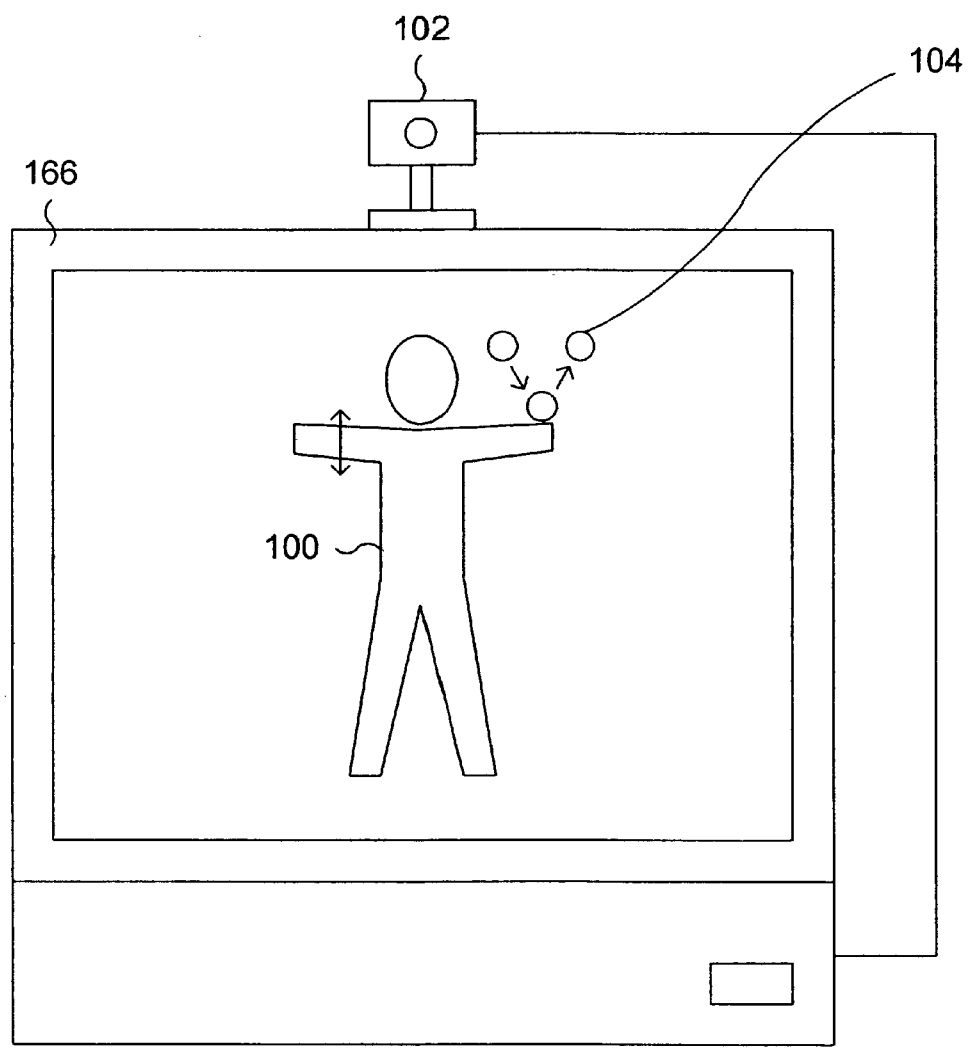
FIG. 1 is an front view of a personal computer with a camera mounted therein, wherein a display of the personal computer depicts an interaction between video images generated by the camera and an object depicted on the display in accordance with one embodiment of the present invention.

With reference to FIG. 1, the present invention is adapted for detecting collisions or any other type of interactions between video images of a person 100 generated by a camera 102 and an animated object 104 depicted on a display 106. This is accomplished using at least two collision detection operations that not only each detect collisions, but also generate a confidence value that is indicative of a certainty that the collision did in fact occur. This information may in turn be used by an associated application for depicting the interaction between the video images of the person 100 and a virtual computer-generated environment.

Figure 2:
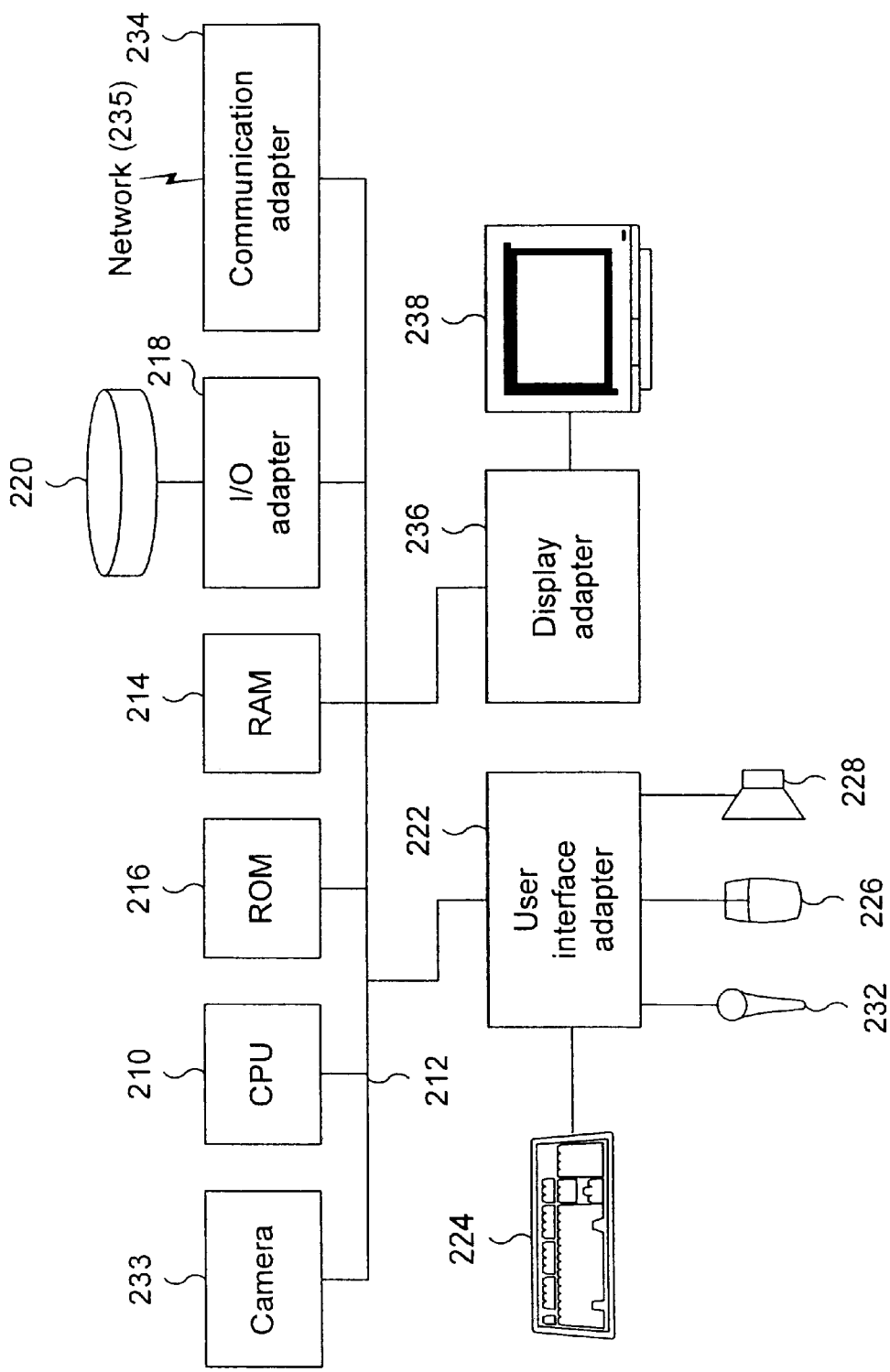
FIG. 2 is a schematic diagram illustrating an exemplary hardware implementation in accordance with one embodiment of the present invention.

FIG. 2 shows an exemplary hardware configuration in accordance with one embodiment of the present invention where a central processing unit 210, such as a microprocessor, and a number of other units interconnected via a system bus 212. The hardware configuration shown in FIG. 2 includes Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, a camera 233 and/or other user interface devices to the bus 212, communication adapter 234 for connecting the hardware configuration to a communication network 235 (e.g., a data processing network) and a display adapter 236 for connecting the bus 212 to a display device 238.

The hardware configuration typically has resident thereon an operating system such as the Microsoft Windows NT or Windows/98/2000 Operating System (OS), the IBM OS/2 operating system, the MAC OS, or UNIX operating system. Those skilled in the art will appreciate that the present invention may also be implemented on platforms and operating systems other than those mentioned. For example, a game system such as a SONY PLAYSTATION or the like may be employed. Yet another example includes an application specific integrated circuit (ASIC) or any other type of hardware logic that is capable of executing the processes of the present invention. Further, in one embodiment, the various processes employed by the present invention may be implemented using C++ programming language or the like.

Figure 3:
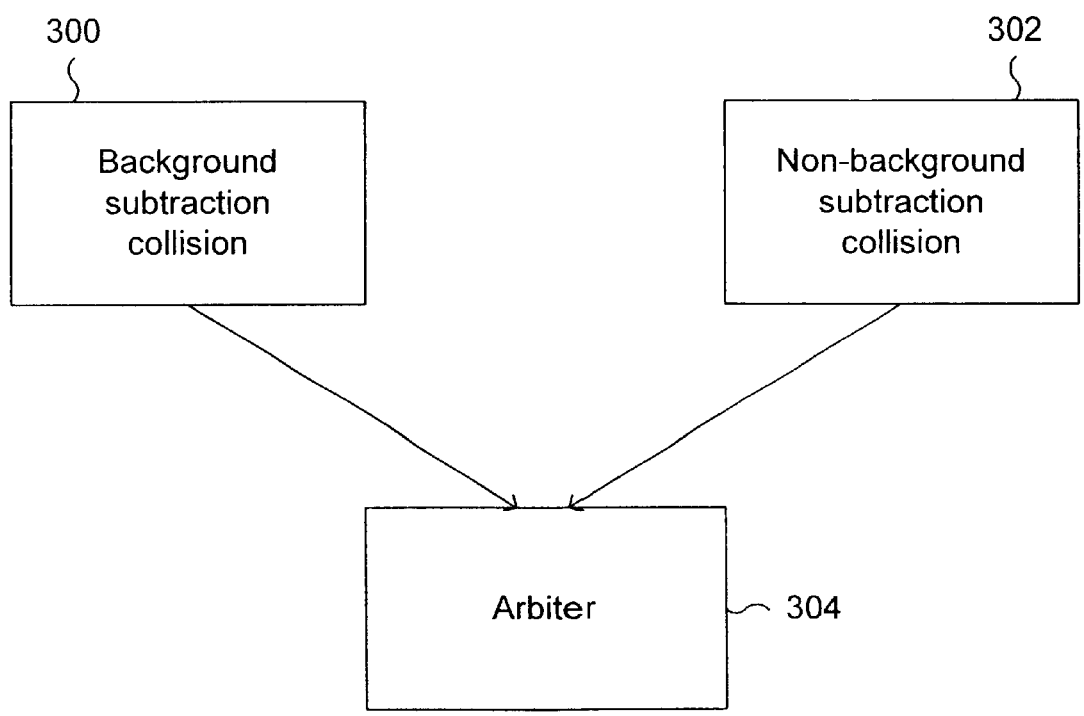
FIG. 3 shows a flow chart for a first collision detection process that detects collisions between video images generated by a camera and an object depicted on a display in accordance with one embodiment of the present invention.

With reference now to FIG. 3, a process is shown where upon receipt of video images generated by a camera, a first collision detection operation is executed in operation 300. It should be noted that the video images may be generated by the camera at any time and not necessarily immediately before being received by the collision detection operation. Further, the video images may be partly computer enhanced or completely computer generated per the desires of the user. The execution of the first collision detection operation is adapted for generating a first confidence value representative of a confidence, or certainty, that the received video images have collided with an object depicted on a display. In operation 302, a second collision detection operation is executed for generating a second confidence value representative of a confidence, or certainty, that the received video images have collided with the object depicted on the display.

It should be noted that the foregoing operations 300 and 302 need not be restricted to detecting collisions, but rather may be employed to detect any type of interaction including, but not limited to collisions. For example, the operations 300 and 302 may be employed to detect a situation wherein the received video images have come within a predetermined distance with respect to the object. Further, the operations 300 and 302 may be employed to detect a situation wherein the received video images have overlapped with the object. Additional examples of interaction include occlusion and indirect interaction, e.g., touching a tree such that a bird therein flies away.

The first confidence value and the second confidence value may then be made available for use by various applications in operation 304. Such applications may decide whether a collision has actually taken place based on the confidence values. Logic such as an AND operation, an OR operation, or any other more sophisticated logic may be employed to decide whether the results of the first collision detection operation and/or the second collision detection operation are indicative of a true collision. For example, if at least one of the collision detection operations indicates a high confidence of collision, it may be decided to assume a collision has occurred. On the other hand, if both collision detection operations indicate a medium confidence of collision, it may be assumed with similar certainty that a collision has occurred. If it is decided to assume that a collision has occurred, an interaction may be shown between the video images generated by the camera and the object depicted on the display. As an option, the interaction may include the object being depicted on the display reacting to a collision with the video images generated by the camera.

In one embodiment, the first collision detection operation may include a background subtraction operation while the second collision detection operation may include an operation other than a background subtraction operation, e.g., a motion-based process.

Figure 4:
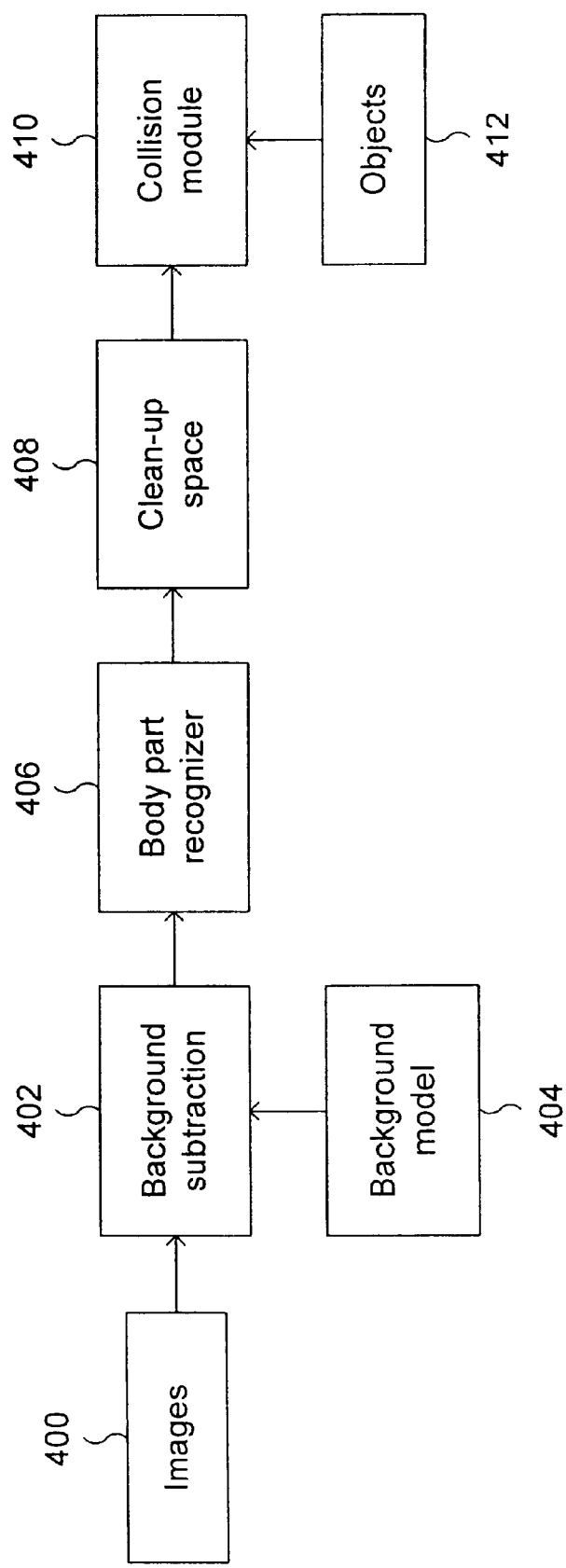
FIG. 4 illustrates a flow chart for a process of the present invention which carries out background subtraction collision detection in operation 300 of FIG. 3.

FIG. 4 illustrates a flow chart for a process of the present invention which carries out background subtraction collision detection as indicated in operation 300 of FIG. 3. The first collision detection operation includes subtracting a background image of the video images 400 generated by the camera in order to extract a person image in operation 402. This may be accomplished by first storing the background image, or model 404, without the presence of the person image. Then, a difference may be found between a current image and the background image. More information on the background model and background subtraction may be found in a patent application entitled "METHOD AND APPARATUS FOR MODEL-BASED COMPOSITING" filed Oct. 15, 1997 under application Ser. No. 08/951,089 which is incorporated herein by reference in its entirety.

Next, in operation 406, the body parts of the person image are recognized. In a preferred embodiment, the body part recognizer operation 406 may be accelerated using a summed area table as referred to in F. C. Crow. Summed-area tables for texture mapping. Computer Graphics, 18(3), 207–212 (1984) which is incorporated herein by reference in its entirety.

After the body part recognizer operation 406, the recognized body parts are "cleaned up" in operation 408. Such clean up operation may include the removal of artifacts or any other type of refinement procedure commonly know to those of ordinary skill in the art. A speed and a direction of the object depicted on the display is then generated based on a collision with at least one body part of the person image of the video images. Note operation 410. In order to accomplish this, the collision operation receives as input coordinates of objects 412 on the display. The speed and direction of the object may thus be used by an application along with the first and second confidence values for depicting the interaction between the video images generated by the camera and the object depicted on the display.

Figure 5:
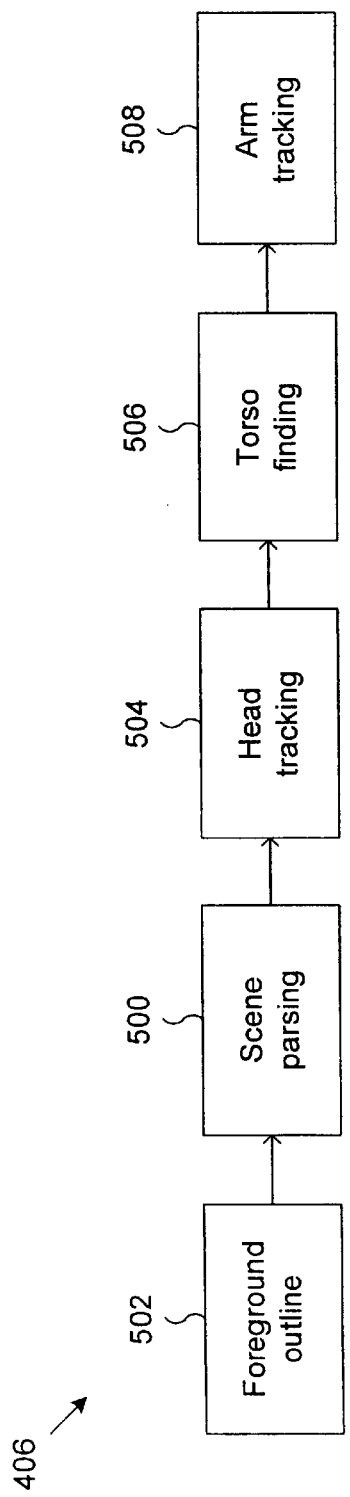
FIG. 5 shows a flow chart for a process of the present invention associated with the body part recognizer operation 406 of FIG. 4.

FIG. 5 shows a flow chart for a process of the present invention associated with the body part recognizer operation 406 of FIG. 4. As shown, such operation may first include identifying a location and a number of person images in the video images generated by the camera in operation 500.

Figure 5A:
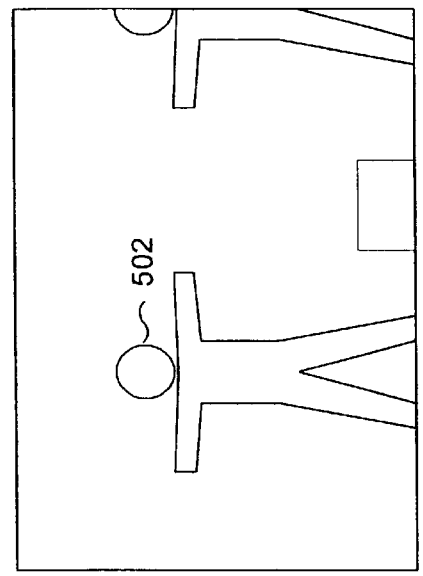
FIG. 5A is an illustration of a foreground outline used as input of the scene parsing operation 500 shown in FIG. 5.

Such "scene parsing" is accomplished by utilizing a person image, or foreground outline(s) 502, that is generated by the background subtraction operation 402 of FIG. 4. FIG. 5A is an illustration of the foreground outline(s) 502 used as input of the scene parsing operation 500 shown in FIG. 5.

After scene parsing, a head, a torso, and limbs(e.g. arms) of the person image are identified in the video images generated by the camera in operations 504, 506 and 508, respectively. The head and torso tracking of operations 504 and 506 will be set forth in greater detail hereinafter with reference to FIGS. 9 and 10, respectively. Many limb tracking techniques, on the other hand, are commonly known to those of ordinary skill in the art.

Figure 6:
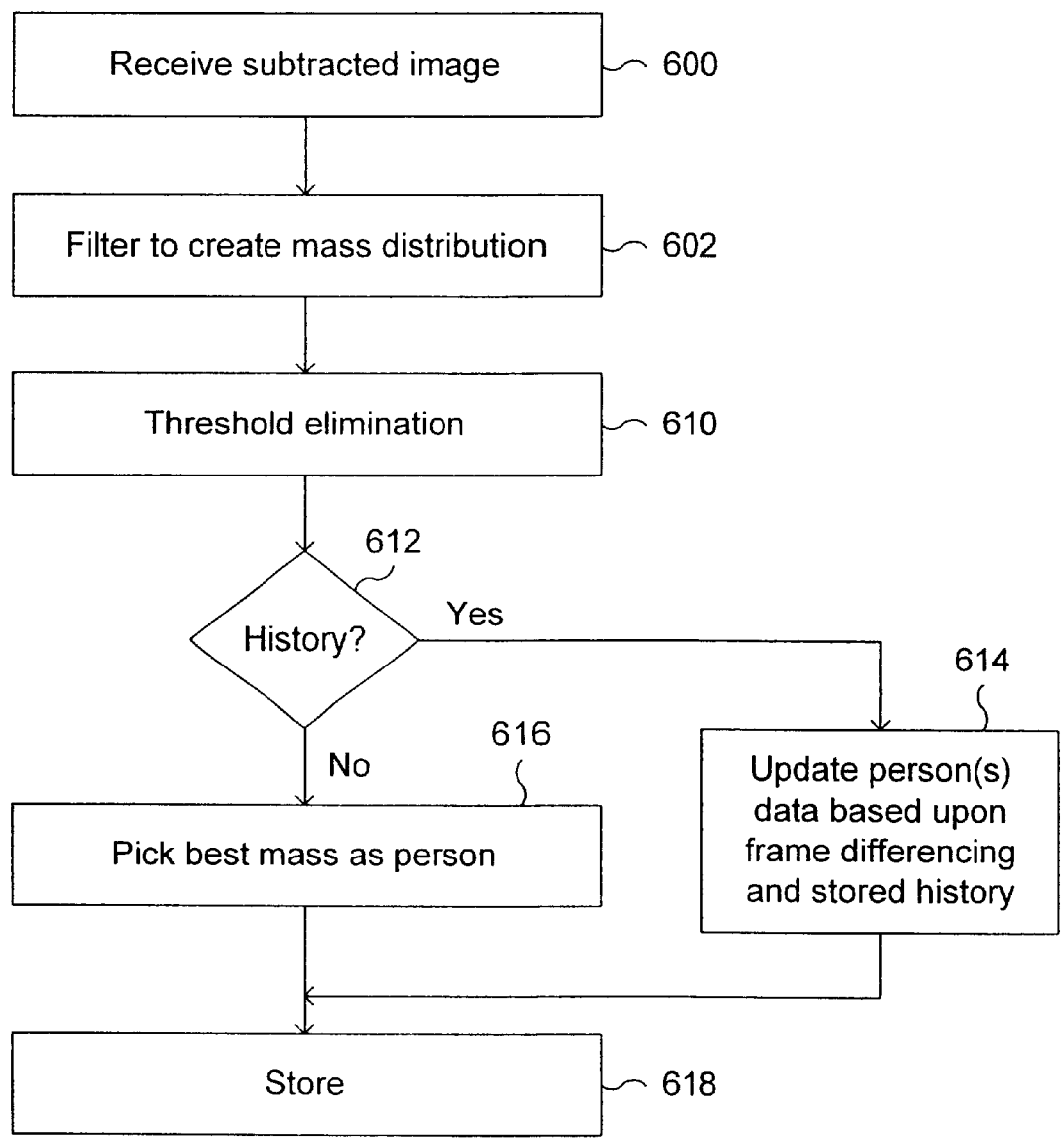
FIG. 6 shows a flow chart for a process of the present invention associated with the scene parsing operation 500 of FIG. 5.

FIG. 6 shows a flow chart for a process of the present invention associated with the scene parsing operation 500 of FIG. 5. As shown, in operation 600, the subtracted image, or foreground outline(s) 502, is first received as a result of the background subtraction operation 402 of FIG. 4. Next, in operation 602, the foreground outline(s) 502 is filtered using a median filter to create a mass distribution map.

Figure 6A:
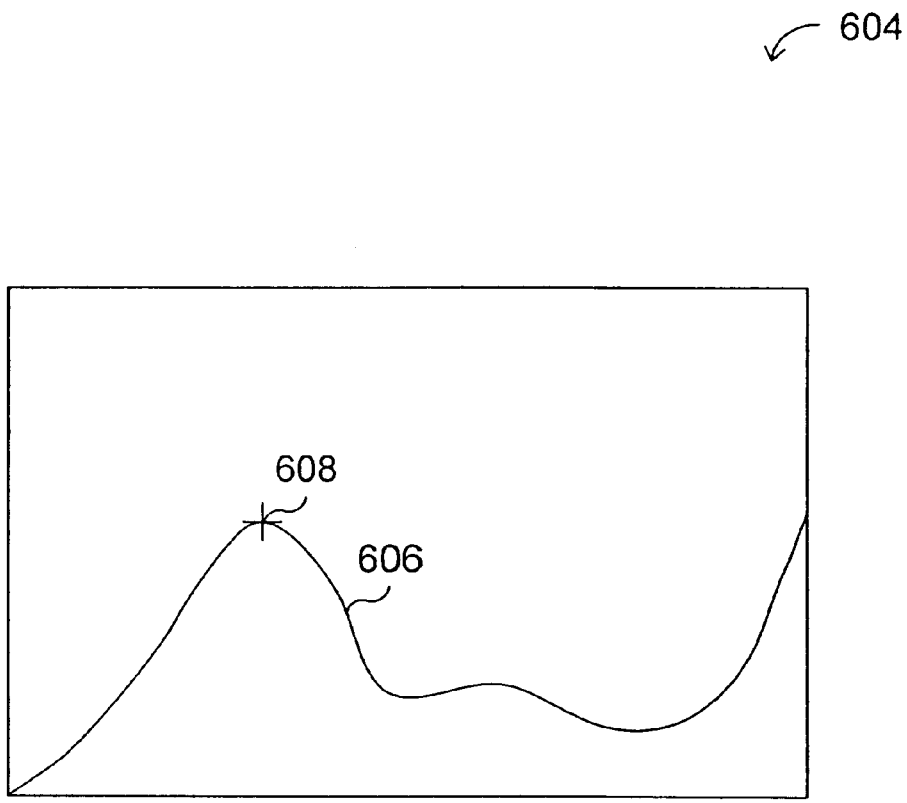
FIG. 6A is an illustration of a mass distribution generated in operation 602 of FIG. 6.

FIG. 6A is an illustration of a mass distribution 604 used in the scene parsing process of FIG. 6. As shown, the mass distribution 604 indicates a number of pixels, or a pixel density, along the horizontal axis of the display that do not represent the background image. In the mass distribution 604 of FIG. 6A, a curve 606 of the mass distribution 604 has a plurality of peaks 608 which represent high concentrations of pixels along the horizontal axis that do not correspond to the background image and, possibly, a person image or other objects.

With continuing reference to FIG. 6, in operation 610, portions of the mass distribution 604 are eliminated if they do not surpass a predetermined threshold. This ensures that small peaks 608 of the curve 606 of the mass distribution 604 having a low probability of being a person image are eliminated. Next, it is then determined whether a previous mass distribution 604, or history, is available in memory. Note decision 612.

If a history is available, the location and number of person images in the video images are identified based on a frame difference between the peaks 608 of a previous mass distribution and the peaks 608 of the current mass distribution 604, as indicated in operation 614. Further details regarding operation 614 will be set forth hereinafter with reference to FIG. 8.

On the other hand, if the history is not available in decision 612, the peaks 608 of the current mass distribution 604 are considered person images in operation 616. In any case, the location and number of person images that are assumed based on the peaks 608 of the mass distribution 604 are stored in operation 618.

Figure 7:
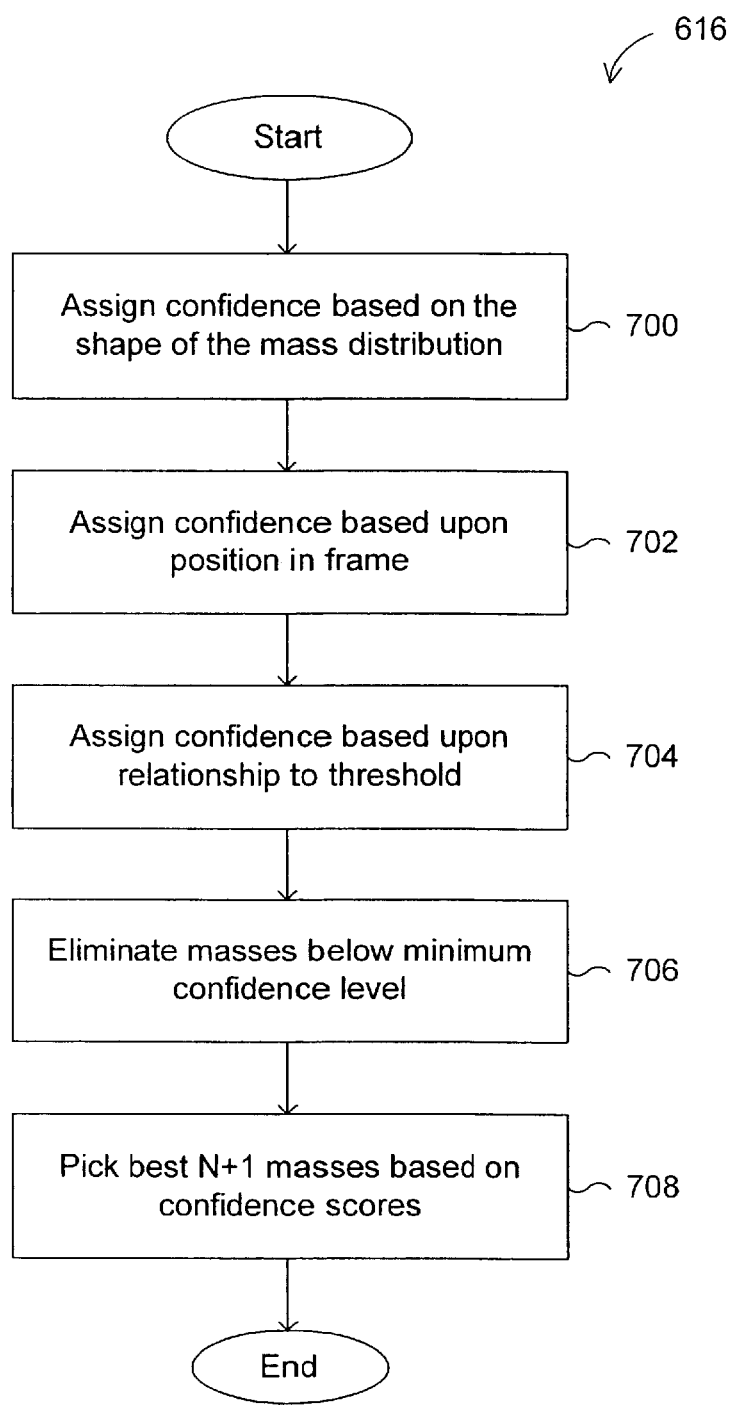
FIG. 7 shows a flow chart for a process of the present invention associated with operation 616 of FIG. 6.

FIG. 7 shows a flow chart for a process of the present invention associated with operation 616 of FIG. 6. As shown, in operation 700, a mass distribution confidence is assigned that is indicative of a confidence that a portion, e.g. a peak, of the mass distribution represents a person image in the video images. For example, a portion of a mass distribution having width and height dimensions similar to that of a human may be assigned a high mass distribution confidence.

Next, in operation 702, a position confidence is determined which is indicative of a confidence that a portion, e.g., a peak, of the mass distribution represents a person image based on a position of the portion of the mass distribution. For example, a portion of a mass distribution having a position which is centered in the display may be assigned a high position confidence.

Still yet, in operation 704, further generated is a threshold confidence indicative of a confidence that a portion, e.g., peak, of the mass distribution represents a person image based on a magnitude of a portion of the mass distribution relative to a threshold. For example, a portion of a mass distribution having a high magnitude may be assigned a high position confidence. It should be noted that the first confidence value associated with the first collision detection operation may be based at least in part on the mass distribution, position, and threshold confidences. For example, the first confidence value may be an average of the foregoing values.

With continuing reference to FIG. 7, peaks of the mass distribution are eliminated if below a minimum total confidence level. Note operation 706. Thereafter, in operation 708, a number of peaks of the mass distribution are assumed to represent person images based on the mass distribution, position, and threshold confidence values. In one embodiment, if history is not available, a maximum of N+1 peaks of the mass distribution are assumed to represent person images, where N is the number of persons the system wants to track at any one time.

Figure 8:
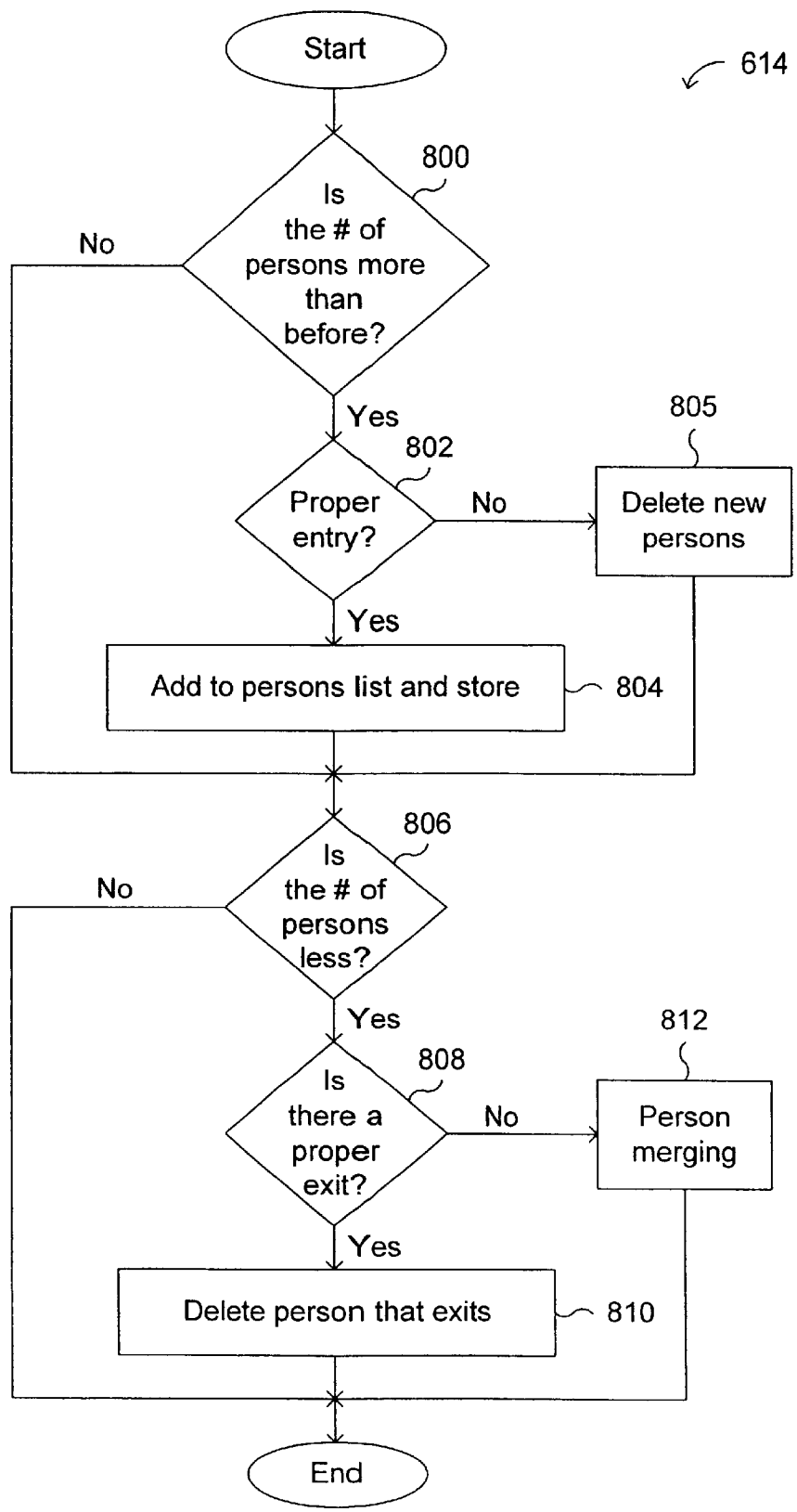
FIG. 8 illustrates a flow chart for a process of the present invention associated with operation 614 of FIG. 6.

FIG. 8 shows a flow chart for a process of the present invention associated with operation 614 of FIG. 6, wherein the history is used to estimate a location and a number of person images in the video images generated by the camera. As shown, in decision 800, it is determined whether the current number of person images is more than in a previous frame. If the current number of person images is indeed more than that stored in memory, it is then determined whether the entry of the additional person images is proper in decision 802. A proper entry may be defined in any manner. For example, in one embodiment, a proper entry may occur only when person images enter from the sides of the video images, or camera image, and not suddenly appear in the middle or enter from a top or bottom edge of the video images.

If it is determined in decision 802 that the entry is proper, the additional person image or images are added to the list of person images to be displayed, as indicated by operation 804. On the other hand, if it is determined in decision 802 that the entry is not proper, the person images in question are deleted, as indicated in operation 805.

If it is determined in decision 800 that the number of person images present is not greater than before, it is then decided in decision 806 as to whether the number of person images present is less than before. If the number of person images present is not less than before, it is assumed that the number of person images has not changed and the process is terminated. On the other hand, if the number of person images is less, it is determined in decision 808 whether the person image executed a proper exit. If so, the person image is deleted in operation 810. However, if the person image did not execute a proper exit, it is assumed that the person images have merged and the situation is handled accordingly in a conventional manner. Note person merging operation 812. It should be noted that the criteria for a proper exit may be similar to that of a proper entry or any other criteria which is indicative of an exit.

Figure 9:
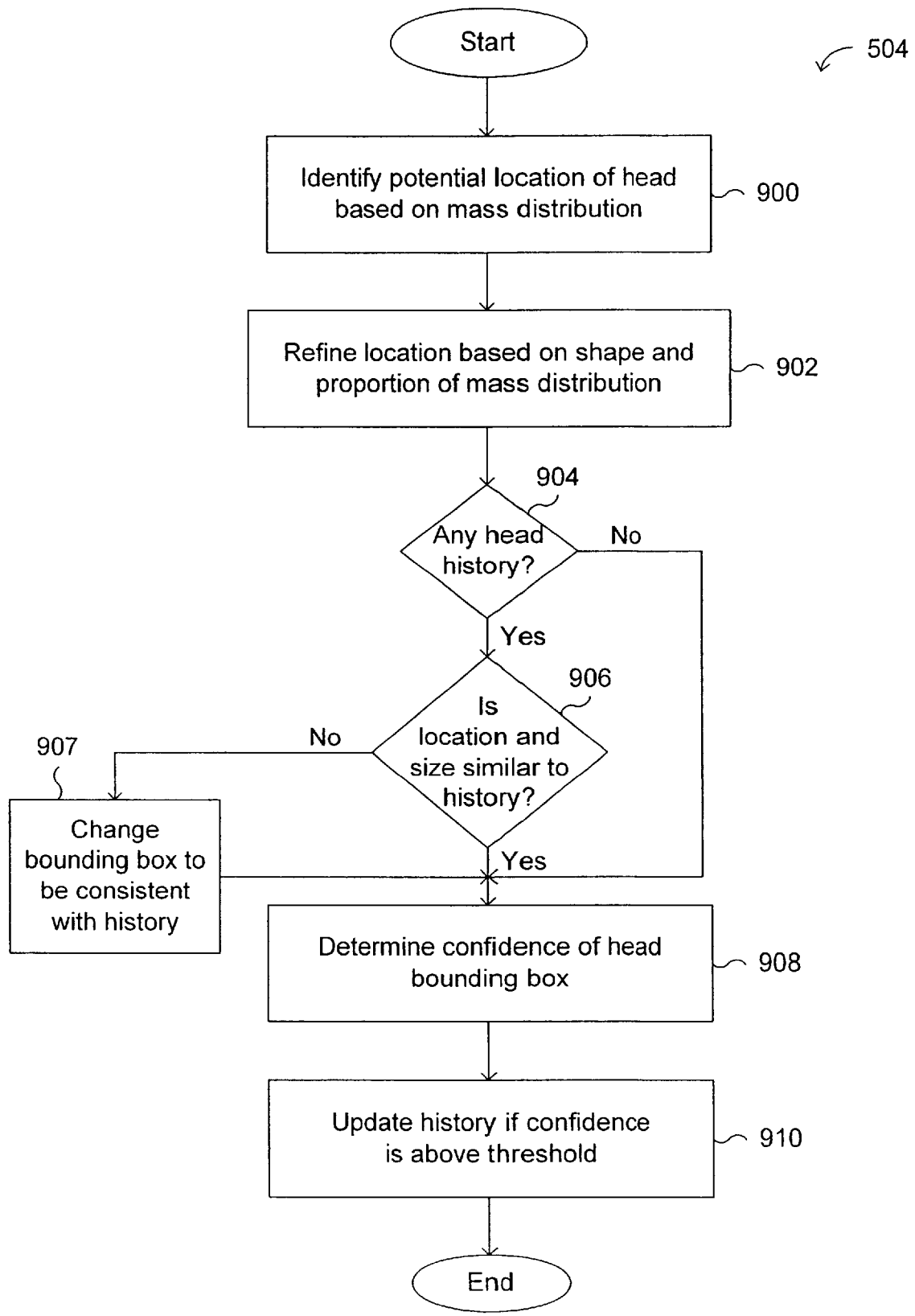
FIG. 9 shows a flow chart for a process of the present invention associated with the head tracking operation 504 shown in FIG. 5.

FIG. 9 illustrates a flow chart for a process of the present invention associated with the head tracking operation 504 shown of FIG. 5. First, in operation 900, the mass distribution is scanned for potential locations of the head of the person image. At first, any peaks in the mass distribution may be considered a potential location of the head of the person image. Next, in operation 902, the potential locations are refined based on a shape and proportion of the peaks of the mass distribution. For example, peaks of mass distributions having a certain width and height may be considered to be a potential location of the head of the person image, while peaks of mass distributions having less than the certain width and height may not.

With continuing reference to FIG. 9, it is determined in decision 904 whether any history exists with respect to the previous head size and location of each person image. Such history may take the form of previous head sizes and locations stored in memory. If it is determined in decision 904 that there is history, it is then determined in decision 906 whether the current head size and location is consistent with the historical head size and location, taking into account motion of the person image and a time duration between frames. If no consistency exists, it is assumed that the current head size and location is erroneous and a bounding box is generated based on the historical head size and location in operation 907. It should be noted that it is the bounding box that defines the estimated location and size of the head of the person image.

If, on the other hand, it is decided in operation 906 that the current head size and location is similar to the historical head size and location, or it is decided in operation 904 that there is no history, a confidence score associated with the head bounding box is generated based on mass distribution, shape, consistency with history, consistency with body proportions, etc. Note operation 908. It should be noted that the first confidence value associated with the first collision detection operation may be based at least in part on the foregoing confidence.

After operation 908, the history is updated to include the current mass distribution if a confidence value of the head bounding box is above a predetermined threshold in operation 910. Further details regarding tracking the head of the person image may be found in a patent application filed Jul. 30, 1999 entitled "SYSTEM, METHOD AND ARTICLE OF MANUFACTURE FOR TRACKING A HEAD OF A CAMERA GENERATED-IMAGE OF A PERSON" which is incorporated herein by reference in its entirety.

Figure 10:
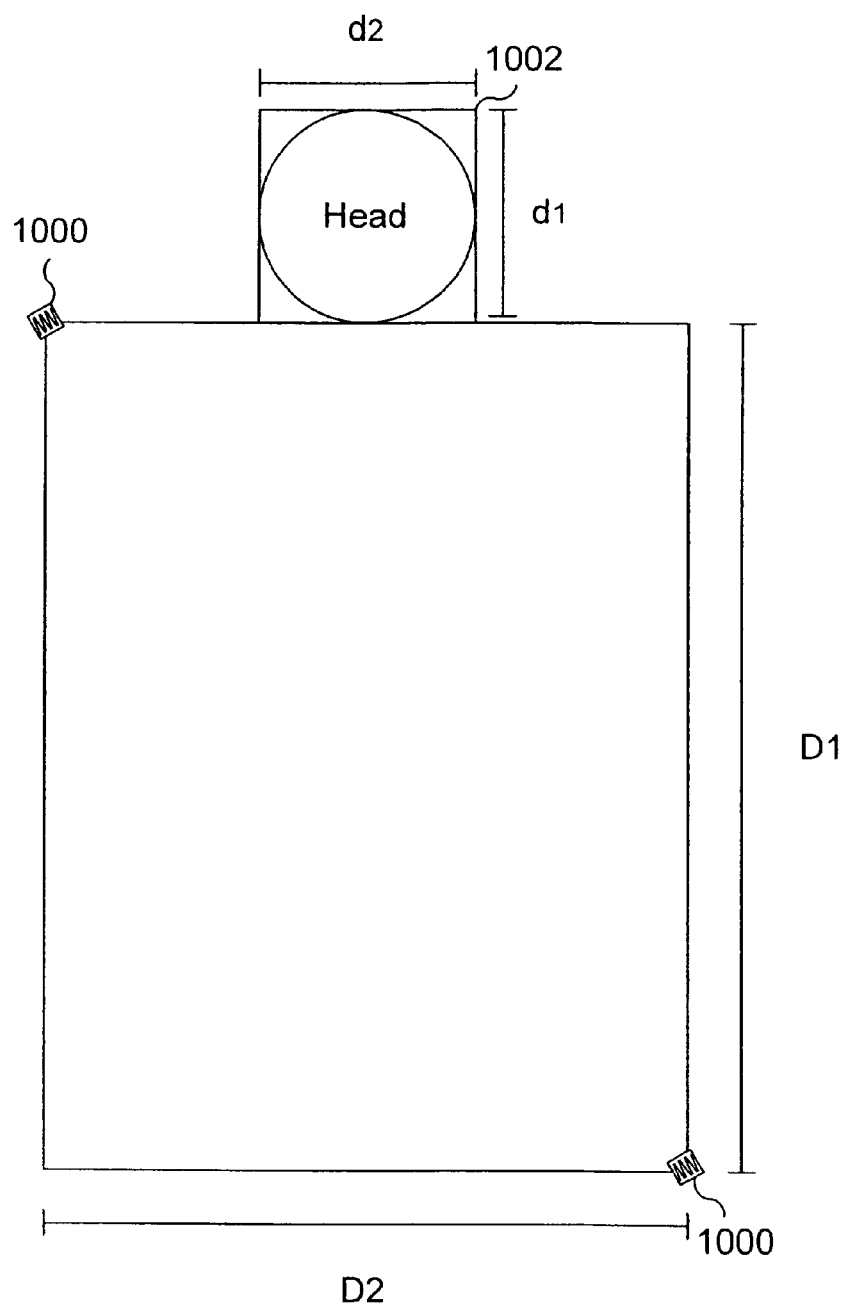
FIG. 10 shows a manner in which the torso finding operation 506 of FIG. 5 locates a torso.

FIG. 10 shows a manner in which the torso finding operation 506 of FIG. 5 locates a torso. As shown, the torso of the person image in the video images generated by the camera may be tracked using information employed during the tracking of the head of the person image in the video images. In particular, a torso bounding box may be defined by a pair of diagonally opposed points 1000 that have a height difference D1 and a width difference D2 which are proportional to a height d1 and a width d2 of the head bounding box 1002.

Figure 11:
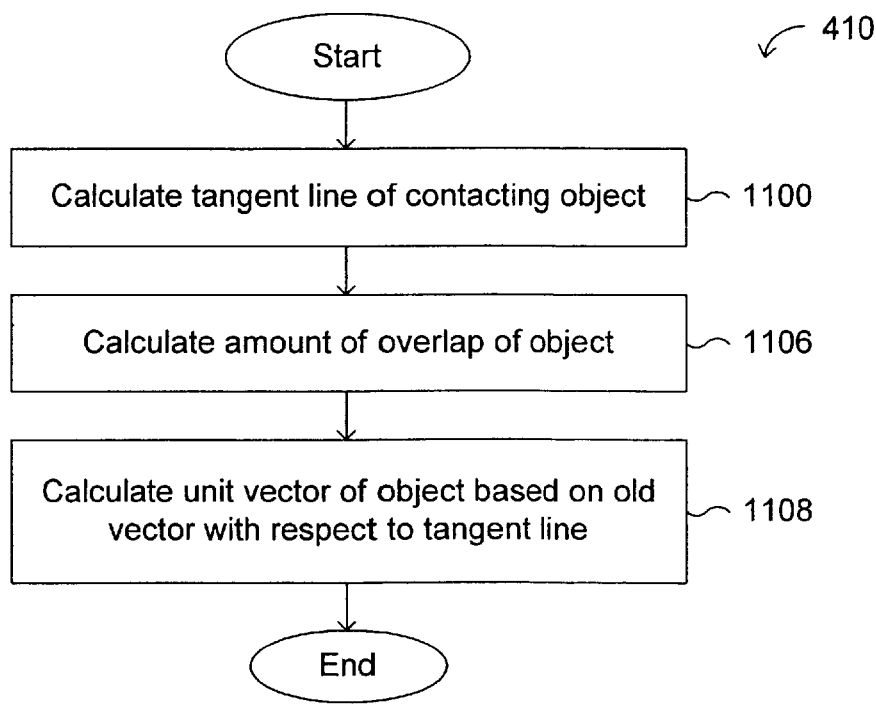
FIG. 11 illustrates a flow chart for a process of the present invention associated with the collision operation 410 of FIG. 4.
Figure 11A:
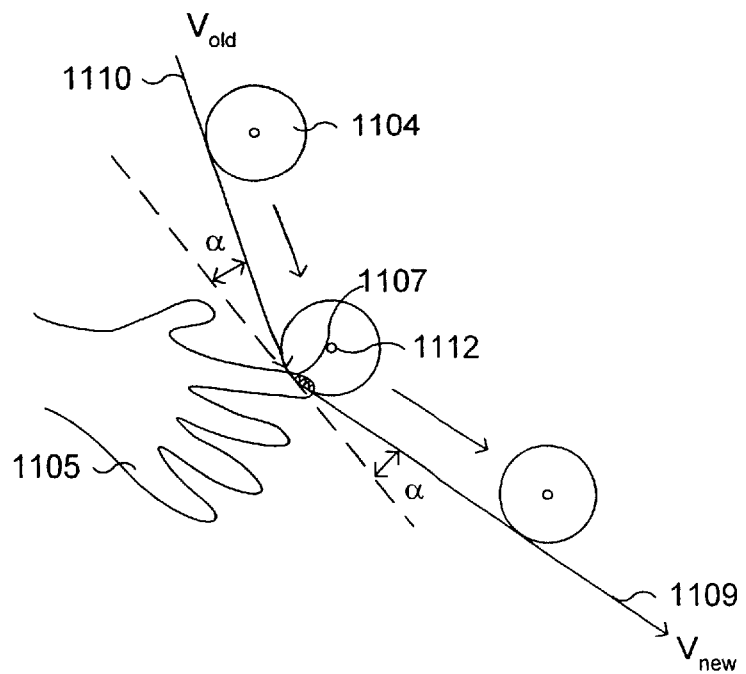
FIG. 11A illustrates a manner in which the process of FIG. 11 generates a direction and speed of a result vector.

FIG. 11 shows a flow chart for a process of the present invention associated with the collision operation 410 of FIG. 4. Such process begins by calculating a tangent line of an object colliding with a body part of the person image in operation 1100. FIG. 11A illustrates the tangent line 1102 of the object 1104 that is colliding with the body part 1105. Thereafter, in operation 1106, an amount of overlap 1107 is calculated between the body part 1105 of the person image and the object 1104.

In operation 1108, a unit vector 1109 associated with the movement of the object 1104 is then calculated based on a previous vector 1110 of the object 1104 with respect to the tangent line 1102. In other words, the direction of the unit vector 1109 may be generated based on a relative position between the body part 1105 of the person image and a center 1112 of the object 1104 depicted on the display. In particular, the unit vector 1109 is created such that the previous vector 1110 and the unit vector 1109 both form a similar angle a with respect to the tangent line 1102. Further, a speed associated with the unit vector 1109 may be generated based on the overlap 1107 between the body part 1105 of the person image and the object 1104 depicted on the display.

Figure 12:
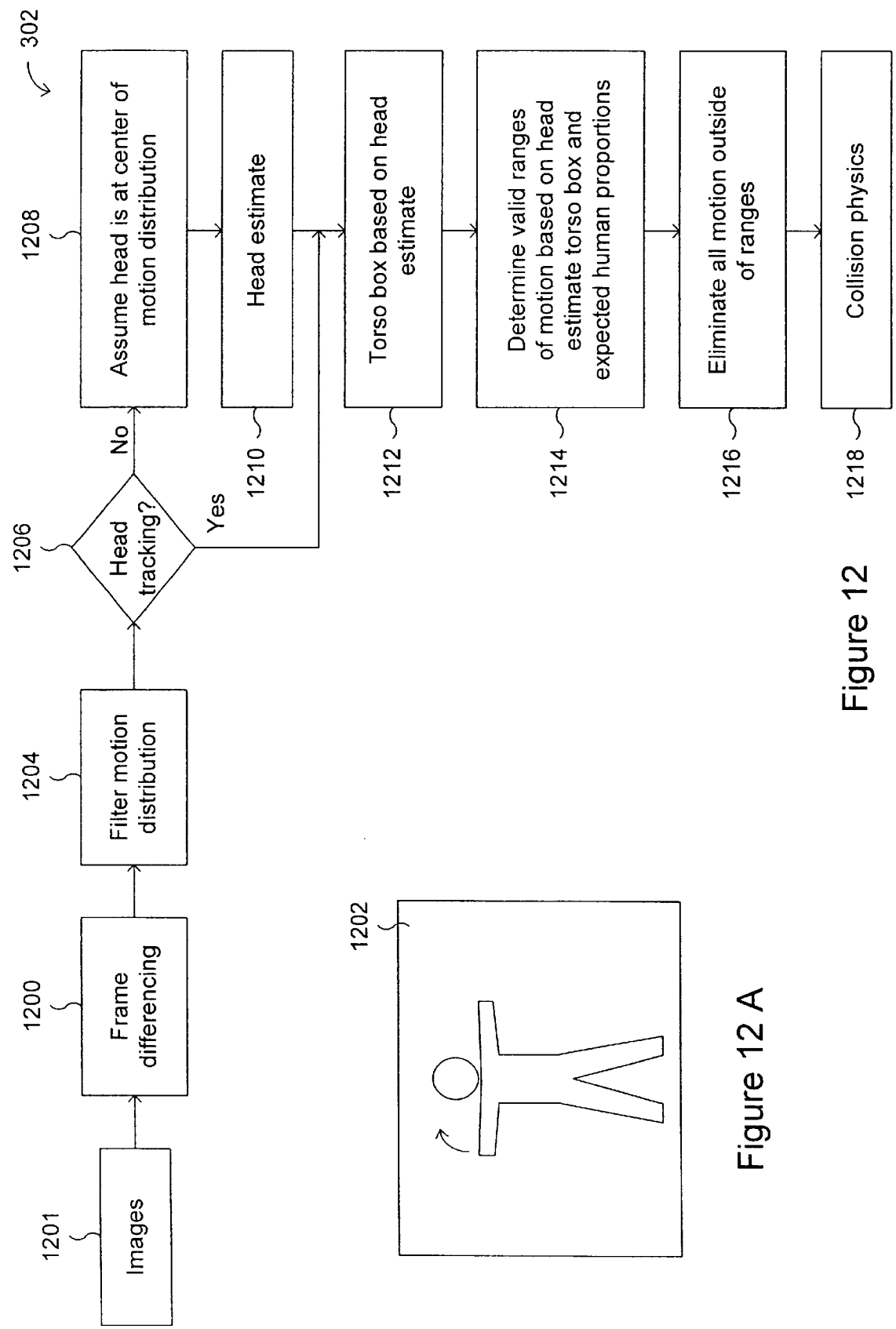
FIG. 12 shows a flow chart for a second collision detector process that detects collisions between video images generated by a camera and an object depicted on a display in accordance with one embodiment of the present invention.

FIG. 12 shows a flow chart for the second collision detection process 302 of FIG. 3 that detects collisions between the video images generated by the camera and the object depicted on the display without background subtraction. In operation 1200, a frame differencing operation is executed, wherein at least two frames of the video images 1201 are compared for determining a difference therebetween. Such difference is then assumed to be motion which is manifested on a motion distribution map. FIG. 12A illustrates such motion distribution 1202. As shown, areas of increased motion include pixels of higher concentrations.

Such motion distribution is then filtered in operation 1204 using conventional techniques which are commonly known to those of ordinary skill in the art. Next, in decision 1206, it is determined whether head tracking is being employed. Such tracking is optional. If head tracking is not being employed, the head of the person image is assumed to be at a center of the motion distribution in operation 1208. Thereafter, a head bounding box is simply estimated with known techniques in operation 1210.

Upon the head bounding box being established, a torso bounding box is generated in operation 1212 in a manner similar to the method set forth in FIG. 10. A set of valid ranges of motion is then determined in operation 1214 based on the frame rate of the camera and the location and size of the head and body. For example, motion occurring too far away from the body is eliminated since it can not be caused by the person moving any of his body part. In the alternative, the valid ranges of motion may be determined using any other desired method.

If any detected motion resides outside of the valid ranges of motion, such motion is eliminated in operation 1216. In operation 1218, a speed and a direction of the object depicted on the display may be generated based on a collision with at least one body part of the person image of the video images. It should be noted that a confidence of a bounding box of the head of the person image may be identified in a manner similar to that of the first collision detection operation. The aforementioned second confidence value may also be based at least in part on such head bounding box confidence. The second confidence value may also be based on the amount of valid motion, and the amount of overlap between the valid motion and the person image.

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present include all such alternatives, modifications, permutations, and equivalents.

What is claimed is:

1. A method of detecting interactions between video images and an object depicted on a display, comprising:
    receiving video images having a person image;
    executing a first interaction detection operation for generating a first confidence value representative of a confidence that a portion of the received video images has interacted with an object depicted on a display, wherein the first interaction detection operation is based at least in part on where the portion of the received video images first appeared and includes generating at least one of a speed and a direction of the object depicted on the display based on the interaction between at least one body part of the person image in the video images and the object depicted on the display;

executing a second interaction detection operation for generating a second confidence value representative of a confidence that a portion of the received video images has interacted with the object depicted on the display, and determning valid ranges of motion based on an estimated location of a head and an estimated location of a torso of the person image in the video images; and outputting the first confidence value and the second confidence value, wherein the depiction of the interaction between the video images and the object depicted on the display is based on the first confidence value and the second confidence value.

2. The method of claim 1, wherein the first interaction detection operation includes a background subtraction operation and the second interaction detection operation includes an operation other than a background subtraction operation.

3. The method of claim 1, wherein the interaction includes the object depicted on the display reacting to an interaction with the video images.

4. The method of claim 1, wherein the object depicted on the display includes an animated object.

5. The method of claim 1, wherein the first interaction detection operation includes:

subtracting a background image of the video images in order to extract the person image; and recognizing body parts of the person image.

6. The method of claim 1, wherein the speed is generated based on an overlap between the at least one body part of the person image in the video images and the object depicted on the display.

7. The method of claim 1, wherein the direction is generated based on a relative position between the at least one body part of the person image in the video images and a center of the object depicted on the display.

8. The method of claim 5, wherein recognizing the body parts of the person image includes:

identifying a location and a number of person images in the video images;

tracking a head of the person image in the video images;

tracking a torso of the person image in the video images; and tracking limbs of the person image in the video images.

9. The method of claim 8, wherein the location and the number of the person images in the video images are identified using a history of the location and the person images in the video images.

10. The method of claim 8, wherein the location and the number of the person images in the video images are identified using a mass distribution.

11. The method of claim 10, wherein the location and the number of the person images in the video images are identified by determining a mass distribution confidence indicative of a confidence that a portion of the mass distribution represents the person image in the video images, wherein the first confidence value is based at least in part on the mass distribution confidence.

12. The method of claim 10, wherein the location and the number of the person images in the video images are identified by determining a position confidence indicative of a confidence that a portion of the mass distribution represents a person image based on a position of the portion of the mass distribution, wherein the first confidence value is based at least in part on the position confidence.

13. The method of claim 10, wherein the location and the number of the person images in the video images are identified by determining a threshold confidence indicative of a confidence that a portion of the mass distribution represents a person image based on a magnitude of a portion of the mass distribution relative to a threshold, wherein the first confidence value is based at least in part on the threshold confidence.

14. The method of claim 9, wherein the head of the at least one person image in the video images is tracked using a history of the head.

15. The method of claim 9, wherein the head of the at least one person image in the video images is tracked using a mass distribution.

16. The method of claim 9, wherein recognizing the body parts of the person image further includes determining a confidence of a bounding box of the head of the person image, wherein the first confidence value is based at least in part on the bounding box confidence.

17. The method of claim 9, wherein the torso of the at least one person image in the video images is tracked using information relating to the tracking of the head of the at least one person image in the video images.

18. The method of claim 1, wherein the second interaction detection operation includes:

generating a motion distribution of a person image in the video images by utilizing frame differencing;

filtering the motion distribution;

estimating a location of a head of the person image in the video images using head tracking;

estimating a location of a torso of the person image in the video images based on the estimated location of the head of the person image in the video images; and eliminating motion outside of the valid ranges of the motion.

19. The method of claim 18, wherein the second interaction detection operation includes assuming a location of the head is in a center of the motion distribution if there is no head tracking.

20. The method of claim 18, wherein the second interaction operation further includes determining a confidence of a bounding box of the head of the person image, wherein the second confidence value is based at least in part on the bounding box confidence.

21. The method of claim 1, wherein the video images are generated by a camera.

22. A computer program embodied on a computer readable medium for detecting interactions between video images and an object depicted on a display, comprising:

a code segment for receiving video images having a person image;

a code segment for executing a first interaction detection operation for generating a first confidence value representative of a confidence that a portion of the received video images has interacted with an object depicted on a display, wherein the first interaction detection operation is based at least in part on where the portion of the received video images first appeared and includes generating at least one of a speed and a direction of the object depicted on the display based on the interaction between at least one body part of the person image in the video images and the object depicted on the display;

a code segment for executing a second interaction detection operation for generating a second confidence value representative of a confidence that a portion of the received video images has interacted with the object depicted on the display, and determining valid ranges of motion based on the estimated location of the head and the estimated location of the torso of the person image in the video images; and a code segment for depicting the interaction between the video images and the object depicted on the display based on the first confidence value and the second confidence value.

23. The computer program of claim 22, wherein the first interaction detection operation includes a background subtraction operation and the second interaction detection operation includes an operation other than a background subtraction operation.

24. The computer program of claim 22, wherein the interaction includes the object depicted on the display reacting to an interaction with the video images.

25. The computer program of claim 22, wherein the object depicted on the display includes an animated object.

26. The computer program of claim 22, wherein the first interaction detection operation is executed by:

a code segment for subtracting a background image of the video images in order to extract a person image; and a code segment for recognizing body parts of the person image.

27. The computer program of claim 22, wherein the second interaction detection operation is executed by:

a code segment for generating a motion distribution of a person image in the video images by utilizing frame differencing;

a code segment for filtering the motion distribution;

a code segment for estimating a location of a head of the person image in the video images using head tracking;

a code segment for estimating a location of a torso of the person image in the video images based on the estimated location of the head of the person image in the video images;

a code segment for eliminating motion outside of the valid ranges of the motion; and a code segment for generating at least one of a speed and a direction of the object depicted on the display based on an interaction between at least one body part of the person image of the video images and the object depicted on the display.

28. The computer program of claim 27, wherein the video images are generated by a camera.

29. A system for detecting interactions between video images and an object, comprising:

an input device for receiving video images;

logic for executing a first interaction detection operation for generating a first confidence value representative of a confidence that a portion of the received video images has interacted with an object depicted on a display, wherein the first interaction detection operation is based at least in part on where the portion of the received video images first appeared and includes generating at least one of a speed and a direction of the object depicted on the display based on the interaction between at least one body part of the person image in the video images and the object depicted on the display;

logic for executing a second interaction detection operation for generating a second confidence value representative of a confidence that a portion of the received video images has interacted with the object depicted on the display, and determining valid ranges of motion based on the estimated location of the head and the estimated location of the torso of the person image in the video images; and a display for depicting the interaction between the video images and the object based on the first confidence value and the second confidence value.

* * * * *